US010380149B2

(12) United States Patent
Torisawa et al.

(10) Patent No.: US 10,380,149 B2
(45) Date of Patent: Aug. 13, 2019

(54) QUESTION SENTENCE GENERATING DEVICE AND COMPUTER PROGRAM

(71) Applicant: National Institute of Information and Communications Technology, Tokyo (JP)

(72) Inventors: Kentaro Torisawa, Tokyo (JP); Jun Goto, Tokyo (JP); Julien Kloetzer, Tokyo (JP); Takuya Kawada, Tokyo (JP)

(73) Assignee: National Institute of Information and Communications Technology, Tokyo (JP)

(*) Notice: Subject to any disclaimer, the term of this patent is extended or adjusted under 35 U.S.C. 154(b) by 290 days.

(21) Appl. No.: 15/503,553

(22) PCT Filed: Aug. 10, 2015

(86) PCT No.: PCT/JP2015/072622
§ 371 (c)(1),
(2) Date: Feb. 13, 2017

(87) PCT Pub. No.: WO2016/027714
PCT Pub. Date: Feb. 25, 2016

(65) Prior Publication Data
US 2017/0242915 A1 Aug. 24, 2017

(30) Foreign Application Priority Data
Aug. 21, 2014 (JP) ................................. 2014-168702

(51) Int. Cl.
*G06F 17/30* (2006.01)
*G06F 16/332* (2019.01)
(Continued)

(52) U.S. Cl.
CPC .......... *G06F 16/3329* (2019.01); *G06F 16/00* (2019.01); *G06F 16/338* (2019.01); *G06F 16/3344* (2019.01)

(58) Field of Classification Search
None
See application file for complete search history.

(56) References Cited

U.S. PATENT DOCUMENTS 7,526,474 B2* 4/2009 Ohkuma ............ G06F 16/3329
7,765,201 B2* 7/2010 Takachio ........... G06F 16/3329
707/713
(Continued)

FOREIGN PATENT DOCUMENTS

JP 2003-058464 A 2/2003
JP 2007-207127 A 8/2007
(Continued)

OTHER PUBLICATIONS

Extended European Search Report for corresponding European Application No. 15833758.4, dated Feb. 1, 2018.
(Continued)

*Primary Examiner* — Debbie M Le
(74) *Attorney, Agent, or Firm* — Renner, Otto, Boisselle & Sklar, LLP

(57) ABSTRACT

[Object] To provide a device assisting a user to easily generate, in relation to an issue of interest to the user, a question sentence guaranteed to have an answer of a certain accuracy or higher in a question-answering system.
[Solution] A question sentence generating device is used with a question-answering system, and it includes: word receiving means for receiving a word 480 as a source for generating a question sentence; and question sentence generating database 502 comprised of a plurality of entries for generating a question sentence. Each of the plurality of entries has a word as a key and includes an answer sentence pattern co-occurring with the word, used in the question-answering system. The question sentence generating device further includes a question sentence generating unit 506, searching the question sentence generating database 502 for an answer sentence pattern using the word 480 received by the word receiving means as a key, for generating a question sentence from a retrieved answer sentence pattern and the received word 480.

11 Claims, 10 Drawing Sheets

(51) Int. Cl.
  *G06F 16/338* (2019.01)
  *G06F 16/33* (2019.01)
  *G06F 16/00* (2019.01)

(56) References Cited

U.S. PATENT DOCUMENTS

| | | | |
|---|---|---|---|
| 8,275,803 B2* | 9/2012 | Brown | G06F 17/28 |
| | | | 707/802 |
| 8,983,977 B2* | 3/2015 | Ishikawa | G06F 16/3329 |
| | | | 707/750 |
| 2005/0114327 A1* | 5/2005 | Kumamoto | G06F 16/3344 |
| 2007/0022099 A1 | 1/2007 | Yoshimura et al. | |
| 2007/0118519 A1* | 5/2007 | Yamasawa | G06F 16/90332 |
| 2007/0196804 A1* | 8/2007 | Yoshimura | G09B 7/02 |
| | | | 434/323 |
| 2013/0317933 A1 | 11/2013 | Torisawa et al. | |
| 2015/0026106 A1* | 1/2015 | Oh | G06F 17/2705 |
| | | | 706/12 |

FOREIGN PATENT DOCUMENTS

| | | |
|---|---|---|
| JP | 2012-155358 A | 8/2012 |
| JP | 2013-016054 A | 1/2013 |
| JP | 2013-171550 A | 9/2013 |
| JP | 2013-254420 A | 12/2013 |
| JP | 2014-134871 A | 7/2014 |

OTHER PUBLICATIONS

International Search report for corresponding International Application No. PCT/JP2015/072622 dated Nov. 2, 2015.

Jun Goto et al., "A Disaster Information Analysis System Based on Question Answering", Journal of Natural Language Processing, Jun. 14, 2013, vol. 20, No. 3, pp. 367-404.

* cited by examiner

QUESTION SENTENCE GENERATING DEVICE AND COMPUTER PROGRAM

TECHNICAL FIELD

The present invention relates to a question-answering system and, more specifically, to a technique allowing a user to use a question-answering system more easily.

BACKGROUND ART

Various question-answering systems applying natural language processing technique have been developed. In such a system, when a question sentence of a natural language sentence is given to the system, an answer is returned as a natural language sentence. At present, with remarkable advancement in computer and network techniques, conditions for wide-spread use of such a question-answering system have been satisfied. We cannot find, however, any question-answering system that is thoroughly penetrated among general users.

There may be various reasons for such unpopularity. By way of example, in a conventional question-answering system, a user makes a question sentence related to matters of his/her interest, presents it to the question-answering system, and receives its answer. When a question is given to the question-answering system in this manner, however, an accurate answer is rarely returned, and it is often the case that the user must try time and again. Such repeated failures discourage users who were at first interested in the question-answering system, and eventually, they cease to use the question-answering system. Further, if a user has a question of some sort, it is often difficult to express it in a specific question. A question-answering system returns an answer only when a question is given in some specific form. Therefore, even if one has a question of some sort about something, he/she cannot get an accurate answer unless that question is expressed in a form of a clear question sentence. Thus, after all, it is difficult to efficiently use the question-answering system.

On the other hand, a technique of information search using so-called keywords has been known. According to this technique, when a keyword is given to the system, sentences highly related to the keyword are retrieved from a database and presented to the user. This method also has a drawback that information appropriate as an answer to the question cannot be obtained unless a good keyword is found. Further, the obtained result is not an answer pin-pointing the answer to the question and, hence, the user has to read a large volume of retrieved documents.

As a technique assisting such keyword search, a so-called keyword suggesting function has been known, which suggests, when a keyword is input, those complementary keywords frequently input with that keyword. The user can improve search accuracy by selecting a suggested keyword.

Even when the keyword suggesting function is used, however, there is still a problem that relation between keywords cannot be made clear. Unless the situation in which a plurality of keywords are used could be specified, search accuracy would remain mediocre at best. After all, the problem that the user must read a huge amount of documents to find an answer cannot be solved.

SUMMARY OF INVENTION

Technical Problem

The reason why the conventional question-answering systems are not widely spread among users is considered to be the high-cost of creating question sentences. In a question-answering system, it is not always easy for a user to create a good question sentence in accordance with his/her interest. By way of example, for a user who is interested in TPP but does not know what to ask, the conventional question-answering system is helpless. Further, in order to get better results, it has been necessary for the user to repetitively change or paraphrase question sentences and to give them to the system. If a user spends a long time to prepare question sentences and if the answer he/she gets is not worth the spent time, the user will not positively use the question-answering system.

On the other hand, in a keyword search using the keyword suggesting function, the input becomes mere enumeration of keywords. The result may include documents highly related to the keywords. It is not very likely, however, that the result gives an accurate answer to the user's question. Consequently, it has been necessary for the user to read a large number of documents retrieved by the search and, hence, the keyword search is not very convenient.

From the foregoing, there is a need for a technique that lowers the cost of preparing question sentences and allows a user to easily generate good question sentences in a natural language, in a question-answering system using natural language processing technique. In doing so, it is desirable that question sentences leading to accurate answers for questions from users in various fields can be generated without necessitating manual preparation of answers.

Therefore, an object of the present invention is to provide a user assisting device and a computer program for assisting a user to prepare a question sentence that leads to a highly accurate answer, when the user tries to obtain an answer on an issue of his/her interest through a question-answering system.

Another object of the present invention is to provide a user assisting device and a computer program for assisting the user to prepare a question sentence that leads to an answer guaranteed to have a certain accuracy or higher on an issue of his/her interest through a question-answering system.

Solution to Problem

According to a first aspect, the present invention provides a question sentence generating device for use with a question-answering system, including: word receiving means for receiving a word or a word sequence as a source for generating a question sentence; and a question sentence generating database comprised of a plurality of records for generating question sentences. Each of the plurality of records has a word as a key, and includes an answer sentence pattern co-occurring with the word, used in the question-answering system. The question-sentence generating device further includes first question sentence generating means configured to search the question sentence generating database for an answer sentence pattern using a word received by the word receiving means as a key, for generating a question sentence from a retrieved answer sentence pattern and the received word.

Preferably, the question sentence generating device further includes a synonym dictionary configured to store synonymous relation or entailment relation of a word or an answer sentence pattern or both; and distinct question sentence selecting means, responsive to the question sentence generating means generating a plurality of question sentences, for selecting distinct ones of the plurality of question sentences to a smaller number of question sentences by referring to the synonym dictionary and outputting results.

More preferably, the question sentence generating device further includes a thesaurus configured to store classification information for classifying words or answer sentence patterns or both systematically in accordance with their meanings; and distinct question sentence selecting means, responsive to the question sentence generating means generating a plurality of question sentences, for selecting distinct ones of the plurality of question sentences to a smaller number of question sentences by referring to the thesaurus and outputting results.

More preferably, the word receiving means is capable of receiving a plurality of words; and the question sentence generating database allows searching, using a plurality of words received by the word receiving means as keys, for an answer sentence pattern co-occurring with the plurality of words.

The question sentence generating means may include question/answer generating means configured to search the question sentence generating database for an answer sentence pattern using the word received by the word receiving means as a key, for generating a question sentence and an answer sentence to the question sentence from a retrieved answer sentence pattern and the received word.

The question-answering system may include a factoid type question-answering sub-system responsive to a factoid type question sentence, configured to generate an answer sentence candidate by searching an answer sentence generating database using a key consisting of a pattern of the question sentence and a word or a word sequence included in the question sentence. The answer sentence generating database of the question-answering system and the question sentence generating database of the question sentence generating device may include common records generated from the same corpus.

Preferably, the question-answering system further includes a non-factoid type question-answering sub-system responsive to a non-factoid type question, configured to extract a plurality of passages as answer sentence candidates from a corpus, to calculate a score indicating fitness as an answer to the given question by using a pre-learned scoring means, and to output an answer sentence candidate having the highest score as an answer to the given question. The question sentence generating device further includes question sentence database configured to store a plurality of question sentences, each generated from any of a set of passages prepared in advance and not explicitly distinguished as a question or an answer and having as an answer a passage as a source of the question sentence; second question sentence generating means, responsive to reception of a word or a word sequence as a source of generating a question sentence, for generating and outputting a new question sentence from the word or word sequence as the source of generating the question sentence or synonyms or entailments of these and from a question sentence stored in the question sentence database by referring to the question sentence database; and means for collectively outputting question sentences output by the first and second question sentence generating means.

According to a second aspect, the present invention provides a question sentence generating device for use with a question-answering system. The question-answering system includes a non-factoid type question-answering sub-system responsive to a non-factoid type question, configured to extract a plurality of passages as answer sentence candidates from a corpus, to calculate a score for each passage, said score indicating fitness as an answer to the given question by using a pre-learned scoring means, and to output an answer sentence candidate having the highest score as an answer to the given question. The question sentence generating device includes: question sentence database configured to store a plurality of question sentences each generated from any passage in the corpus and having as an answer a passage as a source of generating the question sentence; and question sentence generating means, responsive to reception of a word or a word sequence as a source of generating a question sentence, for generating and outputting a new question sentence from the word or word sequence as the source of generating the question sentence or synonyms or entailments of these and from a question sentence stored in the question sentence database by referring to the question sentence database.

According to a third aspect, the present invention provides a computer program causing a computer to function as a question sentence generating device for use with a question-answering system. The computer is used connected to question sentence generating database comprised of a plurality of records for generating question sentences. Each of the plurality of records has a word as a key and includes an answer sentence pattern used in the question-answering system, co-occurring with the word. The computer program causes the computer to function as: word receiving means for receiving a word or a word sequence as a source for generating a question sentence; and question sentence generating means configured to search the question sentence generating database for an answer sentence pattern using a key consisting of a word received by the word receiving means, for generating a question sentence from a retrieved answer sentence pattern and the received word.

DESCRIPTION OF EMBODIMENTS

Figure 1:
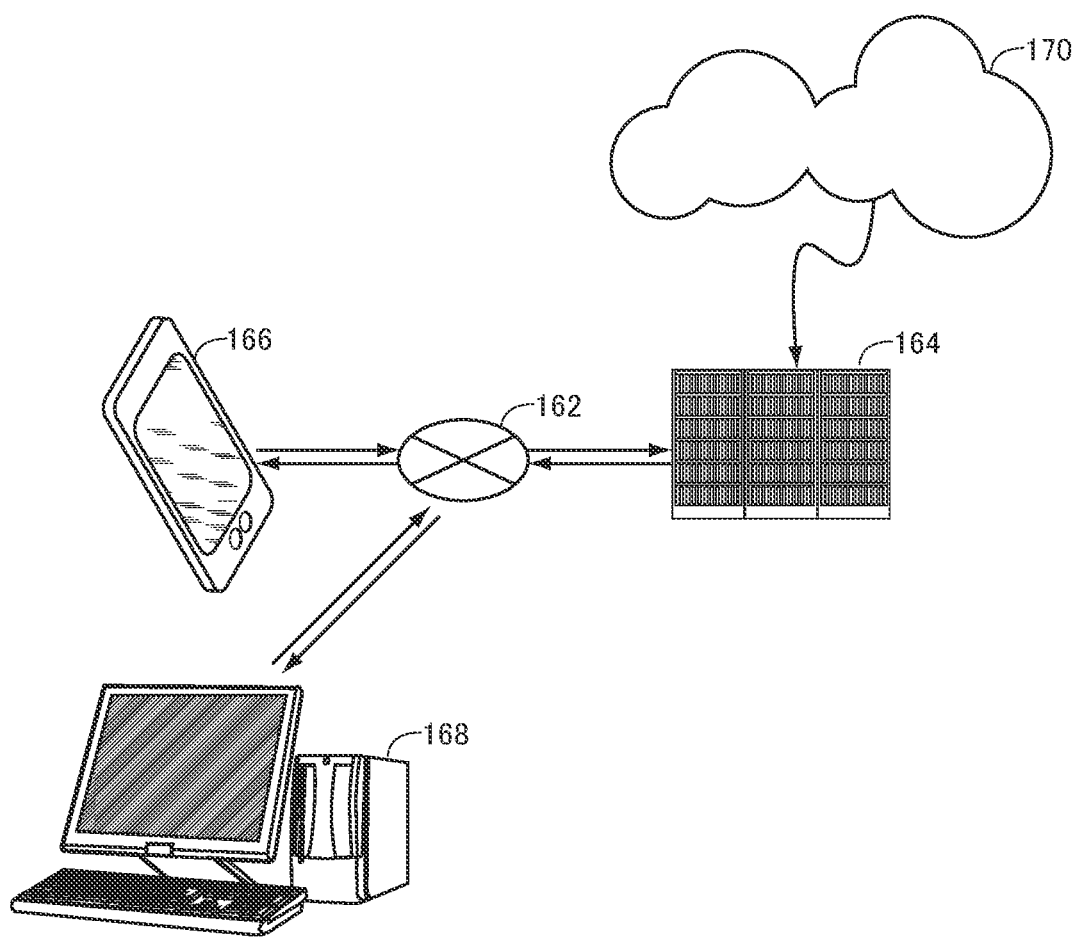
FIG. 1 is a schematic block diagram representing an overall configuration of a network using a question-answering system adopting a question sentence generating device in accordance with an embodiment of the present invention.

In the following description and in the drawings, the same components are denoted by the same reference characters. Therefore, detailed description thereof will not be repeated.

[Configuration]

In response to a question such as "What does Abe administration aim at?" question-answering systems developed to date creates a pattern "A aims at B", and searches a database with two keys consisting of the pattern and A="Abe administration" for a word corresponding to B as an answer. The database is prepared by collecting a large number of sentences from websites on the Internet, and by storing one word as an answer in a table keyed to the combination of the other word and the pattern. In the present example, if a sentence "Abe administration aims at joining TPP" exists in the database, an answer B="joining TPP" can be retrieved from the database as an answer to the question like above.

Questions include those of the type that can be answered by a simple word or a short phrase (called factoid type questions) and the type that cannot be answered by a simple word or a short phrase (called non-factoid type questions), such as questions related to reasons or to a manner of doing something. The question above "What does Abe administration aim at?" is an example of the factoid type question. A question "Why does Abe administration aim at joining TPP?" is an example of the non-factoid type question. The system in accordance with an embodiment described in the following assists a user to pose a good question by presenting exemplary questions to the user, no matter whether the question is of the factoid type or non-factoid type.

Referring to FIG. 1, a question-answering system 164 adopting the question sentence generating system in accordance with one embodiment of the present invention is connected to the Internet 162, and it is for providing an accurate answer to a question sentence given from a mobile terminal 166 or a computer 168 connected to the same Internet 162. For this purpose, question-answering system 164 has collected a huge volume of text data from a set 170 of websites on the Internet beforehand, formed, and is keeping, a database ("DB") for generating an answer to a question.

Figure 2:
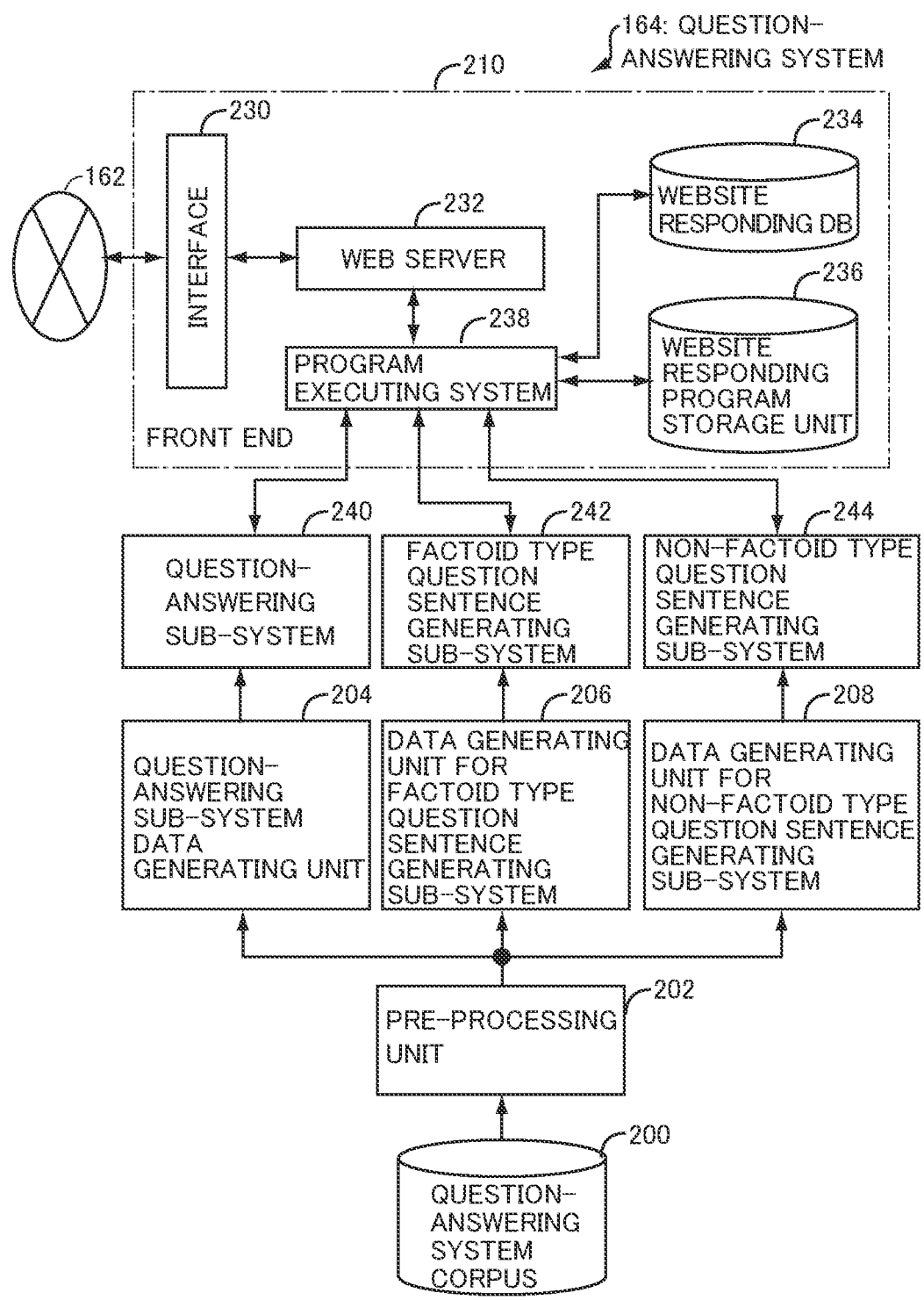
FIG. 2 is a block diagram showing an overall configuration of the question-answering system in accordance with the embodiment of the present invention.

FIG. 2 is a block diagram schematically showing a configuration of question-answering system 164 shown in FIG. 1. Referring to FIG. 2, question-answering system 164 includes: a question-answering system corpus 200 comprised of sentences collected from the Internet; a pre-processing unit 202 configured to perform pre-process for preparation of an answer generating DB and a question sentence generating DB, the answer generating DB for generating an answer to the question from the sentences stored in the question-answering system corpus 200, the question sentence generating DB for assisting the user to generate a good question sentence; a question-answering sub-system 240 responsive to a question sentence, configured to generate and output an answer sentence in natural language by searching the answer-generating DB held therein; a factoid type question sentence generating sub-system 242 responsive to reception of one or a plurality of words (hereinafter referred to as "words"), configured to look up the factoid type question sentence generating DB using the words as keys, to generate a plurality of factoid type question sentences having an answer consisting of words, things and the like related to the words, and to output a list of these sentences; a non-factoid type question sentence generating sub-system 244 responsive to reception of words, configured to look up a non-factoid type question sentence generating DB based on the words, and to generate non-factoid type question sentences asking reasons, methods, definitions and the like of some sort related to the words; a front end 210 of the question-answering system; a question-answering sub-system data generating unit 204 for generating DB for question-answering sub-system 240 using outputs from pre-processing unit 202; a data generating unit 206 for a factoid type question sentence generating sub-system, configured to generate DB for factoid type question sentence generating sub-system 242 using outputs from pre-processing unit 202; and a data generating unit 208 for a non-factoid type question sentence generating sub-system, configured to generate DB for non-factoid type question sentence generating sub-system 244 using outputs from pre-processing unit 202.

Front end 210 includes: an interface 230 providing connection to Internet 162; a web server 232; website responding DB 234; a website responding program storage unit 236; and a program executing system 238 responsive to a request applied from another terminal through interface 230 and web server 232, configured to read an appropriate program from website responding program storage unit 236 and to search website responding DB 234 for appropriate data, and to thereby create a web page and to return it to the counterpart terminal through web server 232 and interface 230. If the received request is in a question form, program executing system 238 gives the question to question-answering sub-system 240, and returns an answer given from question-answering sub-system 240 to the counterpart terminal. If the request is in a form of words, the system gives the words to factoid type question sentence generating sub-system 242 and to non-factoid type question sentence generating sub-system 244, and returns an obtained question sentence or sentences to the counterpart terminal.

Figure 3:
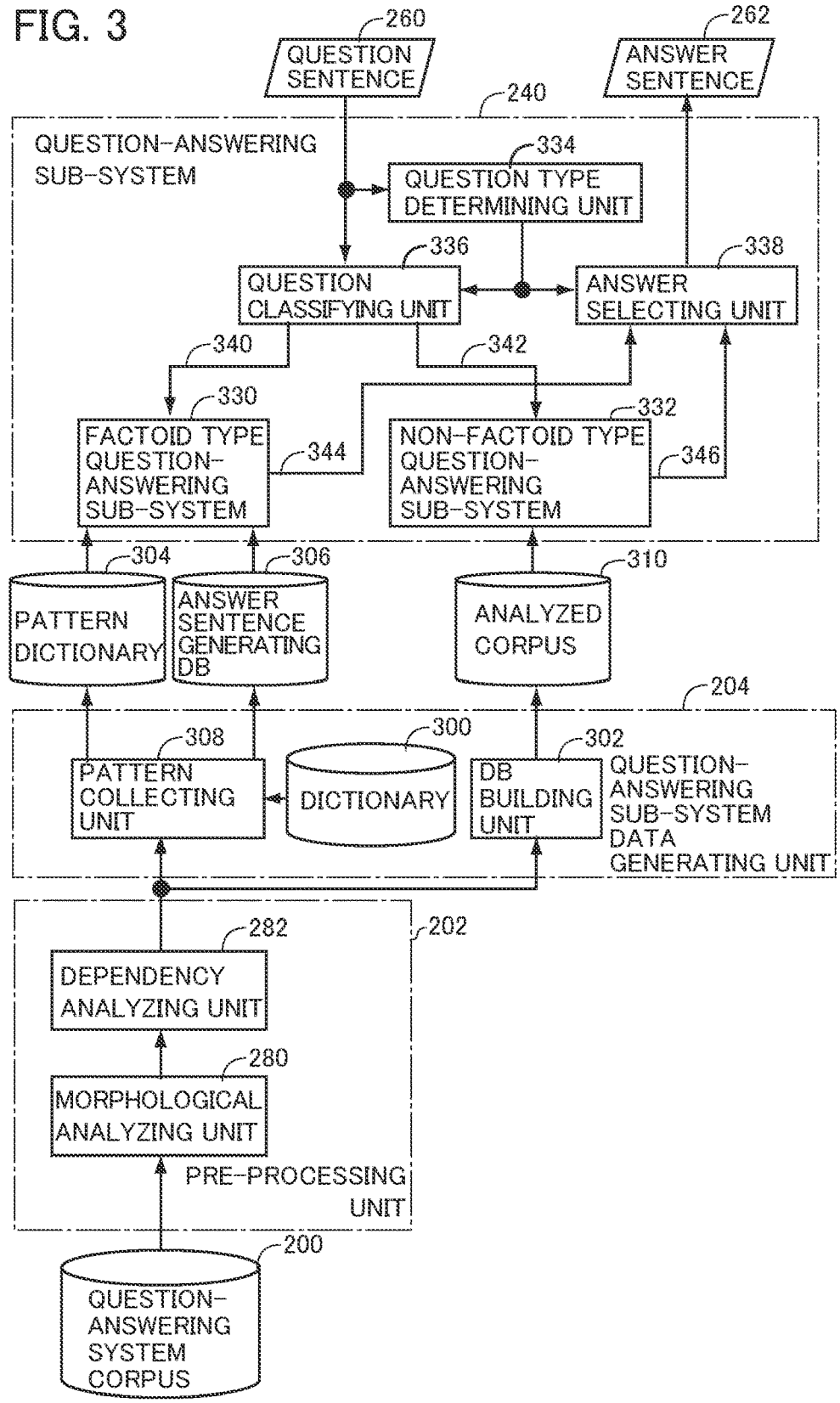
FIG. 3 is a block diagram showing a configuration of a question-answering sub-system of the question-answering system shown in FIG. 2.

FIG. 3 shows question-answering sub-system 240 and its related configuration. Referring to FIG. 3, pre-processing unit 202 includes: a morphological analyzing unit 280 that performs morphological analysis of each sentence in question-answering system corpus 200, adds grammatical information such as parts of speech, inflected forms and readings, and outputs a sequence of morphemes; and a dependency analyzing unit 282 that analyzes dependency relation of sentences using the sequence of morphemes output from morphological analyzing unit 280, and outputs a network (graph) of a form having words as nodes and dependency relation between the words as edges.

Question-answering sub-system data generating unit 204 includes: a dictionary 300 storing semantic classes of words; a pattern collecting unit 308 configured to generate a pattern dictionary 304 by extracting different patterns from the dependency relation network output from dependency analyzing unit 282 using information stored in dictionary 300, and to generate, based on outputs from dependency analyzing unit 282, an answer sentence generating DB 306 that stores answer sentence candidates in such a form that allows, when a certain word and a pattern ID are given, retrieving of words that are different from and co-occur with the word and a pattern of the pattern ID, using the word and the pattern ID as keys; and a DB building unit 302 configured to receive the outputs from dependency analyzing unit 282 for building analyzed corpus 310 for non-factoid type question-answering sub-system 332. In order to realize the functions described above, in the present embodiment, answer sentence generating DB 306 stores a large number of records each consisting of a 3-tuple including the word and the pattern ID as keys and a word as a search object, in a form allowing high-speed searching.

Question-answering sub-system 240 includes: a factoid type question-answering sub-system 330 configured to generate an answer to a factoid type question; a non-factoid type question-answering sub-system 332 configured to generate an answer to a non-factoid type question; a question type determining unit 334 configured to receive a question sentence 260 and to determine whether the question sentence is a factoid type question sentence or a non-factoid type question sentence, and to output the result of determination; a question classifying unit 336 configured to receive question sentences 260 and the outputs from question type determining unit 334 and to distribute question sentences 260 to factoid type question-answering sub-system 330 as question sentences 340, or to non-factoid type question-answering sub-system 332 as question sentences 342; and an answer selecting unit 338 configured to receive an answer sentence 344 output from factoid type question-answering sub-system 330 and an answer sentence 346 output from non-factoid type question-answering sub-system 332, to select one of these in accordance with the question type output from question type determining unit 334 and to output it as an answer sentence 262.

Factoid type question sentences and non-factoid type question sentences have different forms. Therefore, it is possible to adopt a question classifier that classifies question sentences in accordance with rules based on their forms as question classifying unit 336. In the present embodiment, however, we use a classifier machine-learned beforehand to distinguish factoid type questions from non-factoid type questions using a collection of huge number of factoid type questions and non-factoid type questions as training data. By way of example, a SVM (Support Vector Machine) may be used.

It is noted that data generating unit 206 for a factoid type question sentence generating sub-system shown in FIG. 2 has a configuration similar to that of data generating unit 208 for a non-factoid type question sentence generating sub-system. Details of the data generating unit 208 for a non-factoid type question sentence generating sub-system will be described later.

Figure 4:
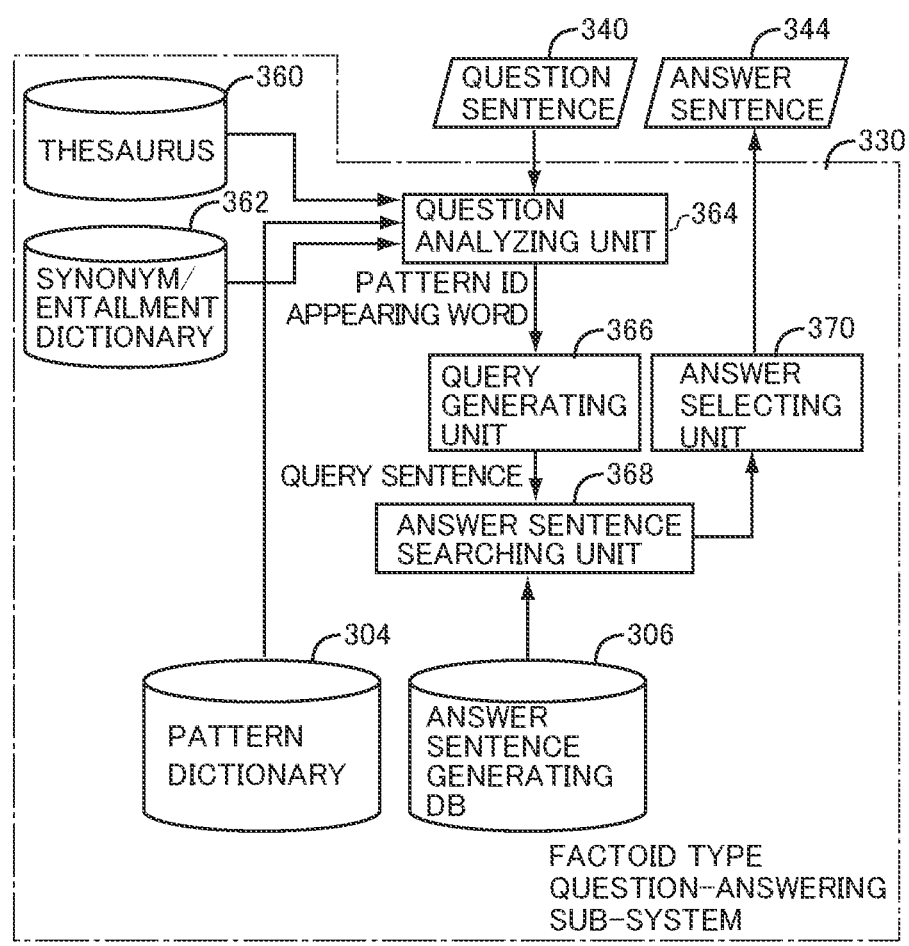
FIG. 4 is a block diagram showing a configuration of a factoid type question-answering sub-system of the question-answering sub-system shown in FIG. 3.

FIG. 4 is a block diagram schematically showing a configuration of factoid type question-answering sub-system 330. Factoid type question-answering sub-system 330 includes: a pattern dictionary 304 storing patterns with respective pattern IDs; the answer sentence generating DB 306 mentioned above; a thesaurus 360 in which words and patterns are systematically classified in accordance with their semantic classes; a synonym/entailment dictionary 362 storing synonymous relations and entailment relations among words and among patterns; a question analyzing unit 364 configured to receive a question sentence 340, to analyze question sentence 340 using pattern dictionary 304, thesaurus 360 and synonym/entailment dictionary 362 and to output a pattern ID that specifies the pattern of the question sentence and words appearing in the question sentence; a query generating unit 366 configured to generate a query for extracting necessary information from answer sentence generating DB 306 based on the output from question analyzing unit 364; an answer sentence searching unit 368 searching answer sentence generating DB 306 by the query generated by query generating unit 366; and an answer selecting unit 370 selecting and outputting an answer sentence 344 that is the most appropriate sentence as the answer to the question sentence 340 from among the answer sentences output from answer sentence searching unit 368. It is noted that pattern dictionary 304 also stores, for every pattern, access information for accessing sentences having that pattern and appearing in question-answering system corpus 200. Therefore, once the pattern ID is known, it is possible to easily access to the sentence or sentences having the pattern.

It is noted that thesauruses and synonym/entailment dictionaries discussed in the following description each store classification information and synonymous/entailment relations related not only to words but also to patterns, as in the case of thesaurus 360 and synonym/entailment dictionary 362. Further, patterns are not limited to those including two variables such as "A likes Y," or "A aims at B." Patterns also include those including only one variable such as "eat X" and "cause X." The pattern dictionary may also contain patterns including three or more variables.

Figure 5:
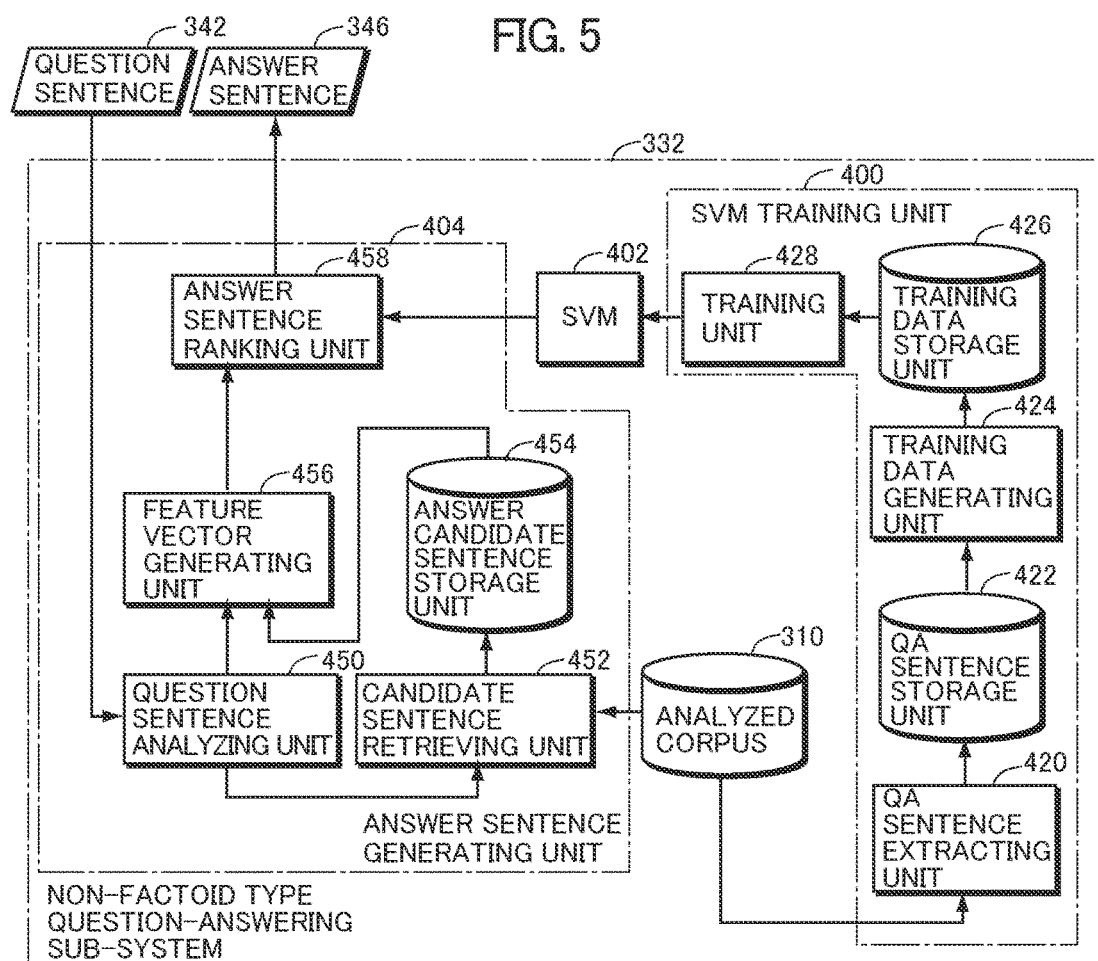
FIG. 5 is a block diagram showing a configuration of a non-factoid type question-answering sub-system of the question-answering sub-system shown in FIG. 3.

Referring to FIG. 5, non-factoid type question-answering sub-system 332 uses the analyzed corpus 310 obtained from question-answering system corpus 200 shown in FIG. 2 described above.

In order to speed-up full-text search, index of words or the like are prepared in advance for the analyzed corpus 310. As will be described later, non-factoid type question-answering sub-system 332 includes: a SVM 402 for outputting a score indicating how fitting an answer candidate is as an answer to question sentence 342; a SVM training unit 400 for training SVM 402 using question-answering system corpus 200; and an answer sentence generating unit 404 configured to generate answer candidates to question sentence 342 with reference to analyzed corpus 310, ranking the candidates using SVM 402, and outputting the top-ranked answer candidate as an answer sentence 346.

Answer sentence generating unit 404 includes: a question sentence analyzing unit 450 configured to receive question sentence 342, to perform predetermined grammatical analysis on question sentence 342 and to output, for each word included in question sentence 342, necessary information (part of speech, inflected form, dependency structure etc.) for generating features; a candidate sentence retrieving unit 452 retrieving a prescribed number of answer candidate sentences to the question by full-text search of analyzed corpus 310 using outputs from question sentence analyzing unit 450 and the question sentence; and an answer candidate sentence storage unit 454 for storing answer candidate sentences retrieved by candidate sentence retrieving unit 452 with their grammatical information. Here, an "answer candidate sentence" is not necessarily a sentence in an ordinary sense, and it may include a plurality of sentences. In the following, such a sentence or a group of sentences will be referred to as a "passage." Further, a "sentence" here refers not only to a "sentence" in an ordinary sense but also a part of a sentence.

Answer sentence generating unit 404 further includes: a feature vector generating unit 456 configured to generate and to output a feature vector having components consisting of features output from question sentence analyzing unit 450 and features obtained from an answer candidate sentence, for each of the combinations of question sentence 342 and answer candidate sentences stored in answer candidate sentence storage unit 454; and an answer sentence ranking unit 458 configured to score each of the feature vectors output from feature vector generating unit 456, using SVM 402, to rank the answer candidate sentences corresponding to the feature vectors in accordance with the scores, and to output the result as an answer sentence 346.

SVM training unit 400 is for training SVM 402 in advance. SVM training unit 400 includes: a QA sentence extracting unit 420 configured to extract, from analyzed corpus 310, a question and an answer forming a pair (hereinafter referred to as an "QA sentence"); and a QA sentence storage unit 422 for storing QA sentences output from QA sentence extracting unit 420. Here, a QA sentence refers to a set of a question and its answer. On the Internet, we can find sites allowing searching of pairs of questions and answers, as well as sites allowing searching or listing of technical terms. By simple processing of information collected from such sites, a large number of QA sentences can be extracted. Here, each of the answer sentences may be one sentence, or may be a unit of passage mentioned above. QA sentence storage unit 422 also stores QA sentences that are incorrect combinations as QA sentences. These incorrect QA sentences may be manually input, or may be prepared by combining two sentences extracted at random from analyzed corpus 310. Each QA sentence has a flag indicating whether it is a correct combination. SVM training unit 400 further includes: a training data generating unit 424 configured to generate training data for supervised learning of SVM 402 from each of the QA sentences stored in QA sentence storage unit 422; a training data storage unit 426 for storing training data output from training data generating unit 424; and a training unit 428 training SVM 402 using the training data stored in training data storage unit 426. By this training, SVM 402 is optimized to provide an output indicating whether or not a given QA sentence is a correct QA sentence and a score representing reliability thereof.

Here, features used as training data of SVM may include the following. By way of example, if a question sentence has a form of "why does . . . " asking the reason of something, each of the answer sentence candidates may include words as clues (clue words) such as "reason," "because" or "ground," which are helpful to determine that the candidate is an appropriate answer to the question sentence. Presence/absence of such a clue word may be one of the features. Other possible features may include: how content words in the question sentence appear in the answer sentence; what positional relations exist among the content words and the clue words; if the question involves determination of whether something is right or wrong, whether or not any part of the answer sentence includes similar determination; and whether or not content words existing in the question collectively appear in the answer sentence. Generally, an answer sentence fitting as an answer to a question sentence is believed to include the question sentence itself or the question sentence somewhat modified. An answer sentence fitting as an answer to a question sentence often include content words existing in the question sentence, and these content words often appear collectively. If these are concentrated around a clue word, the answer sentence would be more relevant to the question sentence. Therefore, it is preferable to use such features for scoring fitness of the answer sentence.

Figure 6:
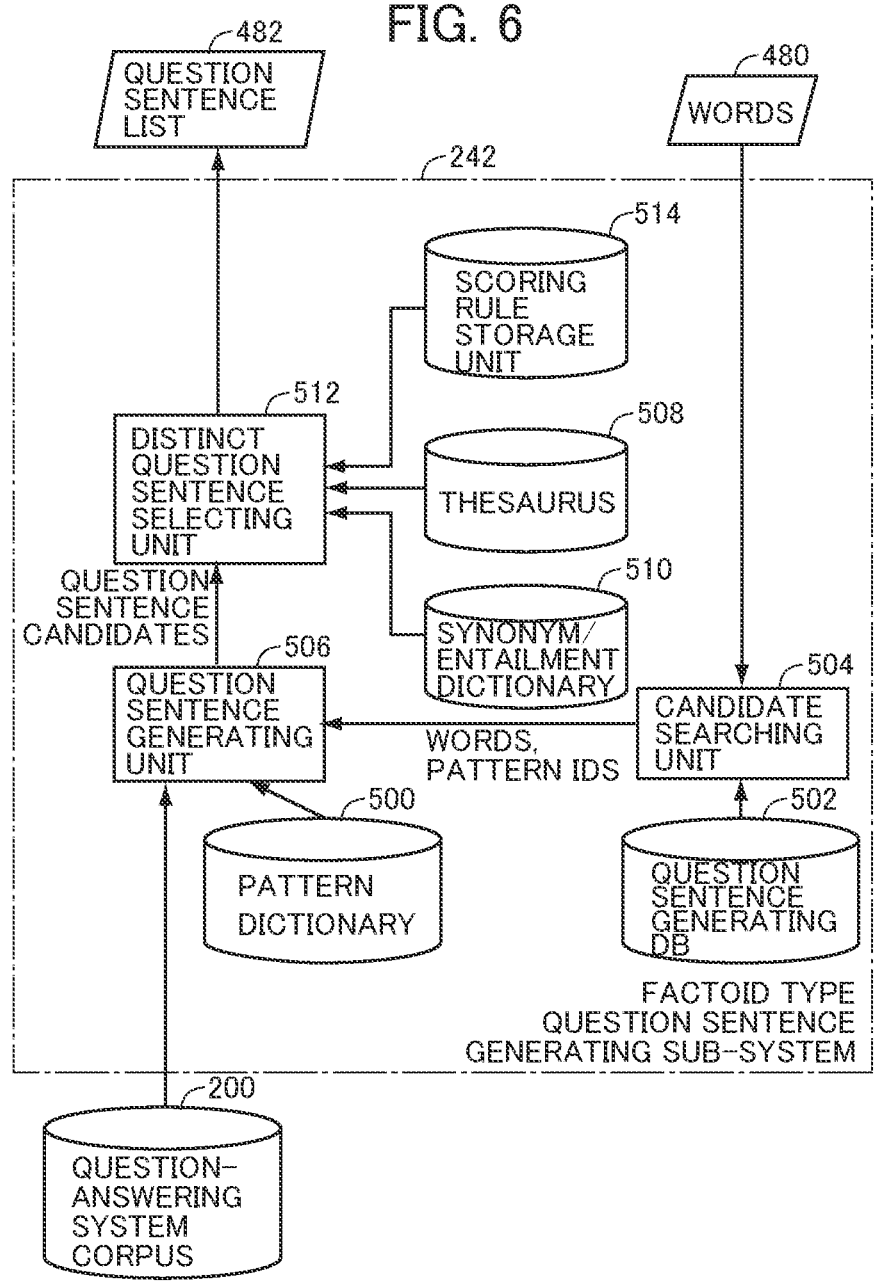
FIG. 6 is a block diagram showing a configuration of a factoid type question sentence generating sub-system of the question-answering system shown in FIG. 2.

FIG. 6 is a block diagram schematically showing a configuration of factoid type question sentence generating sub-system 242. Referring to FIG. 6, factoid type question sentence generating sub-system 242 includes: a pattern dictionary 500 formed in a manner similar to pattern dictionary 304 shown in FIG. 4, allowing searching question-answering system corpus 200 using a word and a pattern ID as a key, for sentences including the word and the pattern identified by the pattern ID; question sentence generating DB 502 comprised of a table including a plurality of records; a candidate searching unit 504 configured to receive words 480; and a question sentence generating unit 506 configured to search question-answering system corpus 200 using the pattern ID output from candidate searching unit 504 and pattern dictionary 500, for answer sentences each including the words and the corresponding pattern, to transform the sentences into a question form and to output them as question sentence candidates. Question sentence generating DB 502 is generated from question-answering system corpus 200, as in the case of answer sentence generating DB 306 shown in FIG. 4. Question sentence generating DB 502 stores a large number of records, each including a 3-tuple consisting of two words and one pattern ID, in such a form that allows a high-speed search. In the present embodiment, the contents of each record in question sentence generating DB 502 are exactly the same as those of answer sentence generating DB 306 shown in FIG. 4, and the number of records is also the same. It is noted, however, whereas answer sentence generating DB 306 is configured to allow a search, using a key consisting of one word and a pattern ID, for the other word, question sentence generating DB 502 differs in that it is configured to allow a search, using a key consisting of a word, for a pattern ID and the other word. Therefore, if answer sentence generating DB 306 and question sentence generating DB 502 are to be created by an RDB, one DB can be shared simply by changing SQL sentences. In the present embodiment, answer sentence generating DB 306 and question sentence generating DB 502 are prepared as separate DBs to attain higher response. It is noted, however, that these can substantially be created using the same data and the same record structures and, advantageously, it is unnecessary to start from data collection to build a new DB specifically for presenting question sentences.

It is noted that the contents of records and the number of records in question sentence generating DB 502 and answer sentence generating DB 306 may not be exactly the same with each other. If question sentence generating DB 502 is a subset of answer sentence generating DB 306, an answer to a question sentence generated using question sentence generating DB 502 can always be found in answer sentence generating DB 306. Therefore, it follows that question sentences assured to have answers with certain accuracy are presented to the user.

Even when a record that is not stored in answer sentence generating DB 306 does exist in question sentence generating DB 502, an answer to it may be obtained from means other than answer sentence generating DB 306. By way of example, there may be a question to which an answer can be obtained by a certain algorithm, as in the case of an answer to an arithmetic calculation. In that case, the corresponding record need not exist in the answer sentence generating DB 306. Therefore, question sentence generating DB 502 may store records other than the subset of answer sentence generating DB 306. In that case also, question sentence generating DB 502 can advantageously be generated easily from the subset of answer sentence generating DB 306.

Further, in the embodiment described above, the contents of the records in answer sentence generating DB 306 and those of question sentence generating DB 502 are the same. Specifically, answer sentence generating DB 306 and question sentence generating DB 502 have the same column structure of records. The column structures, however, may not be exactly the same. For example, in connection with the order of display of answers by the question-answering system, options such as "display answers in ascending order of length" or "display answers in descending order of date" may be provided. In that case, each record of answer sentence generating DB 306 must have a column of the number of characters of each answer, or a column of the first date of retrieval of the answer. Such columns are unnecessary in the question sentence generating DB 502, and vice versa.

Specifically, what is necessary is that answer sentence generating DB 306 and question sentence generating DB 502 have common portions including the column structures of records. Specifically, their record columns may have common portions described in the present embodiment and, in addition, columns not common to them. The overall DBs may include corresponding records or common records formed from the same portions of the same corpus and, in addition, each DB may include other records.

With such a structure, we can still enjoy the benefit that question sentence generating DB 502 can be created based upon answer sentence generating DB 306.

Factoid type question sentence generating sub-system 242 further includes: a thesaurus 508; a synonym/entailment dictionary 510; a scoring rule storage unit 514 storing scoring rules for scoring question sentences; and a distinct question sentence selecting unit 512 configured to select distinct questions from cumulative questions in question sentences using thesaurus 508 and synonym/entailment dictionary 510, to score remaining question sentences using the rules stored in scoring rule storage unit 514, to select question sentences of high scores and to output a question sentence list 482. Each record of question sentence generating DB 502 has such a form that is keyed to a word to allow retrieval of a pattern that co-occurs with the word. Selection of distinct question sentences by distinct question sentence selecting unit 512 uses the following scheme.

Using synonymous relations of words, those words having synonymous relations are uniformly replaced by a representative word.

Again using synonymous relations of patterns, those patterns having synonymous relations are uniformly replaced by a representative pattern.

Entailment relations among words and patterns are also similarly processed. It is noted, however, that if there are two words having an entailment relation, the word at a semantically higher order, that is, the word that entails the other word of a lower order, replaces the other word. The same applies to patterns.

If such a replacing process results in the same or substantially the same question sentences, one of them is selected and others are removed.

The thesaurus and the synonym/entailment dictionary may be adopted to store in advance what representative words and what patterns should be used. The representative words and representative patterns may be manually registered, or may be determined beforehand by some machine learning. Further, the words and patterns may be unified in any order. By way of example, words may be unified first by using the synonymous relations and then question sentences may be unified, and in such a manner, distinct question sentences may be selected step by step.

The scoring rules stored in scoring rule storage unit 514 relates to a site policy concerning what type of question sentences are to be ranked higher. By way of example, question sentences may be scored based on classes, specified by thesaurus 508, of words appearing in the source sentences of question sentences, or scores of question sentences may be made higher or lower in accordance with combinations of appearing words. Further, it is also possible to score question sentences based on classes of words that existed in the source sentences but do not appear in the question sentences. Not only the classes of words but also other information for scoring may be added to all words or to some words. Further, priority of applying scoring rules may be determined. The scoring rules and the scoring calculation method following the rules are designed in accordance with a sort of programming language scheme. Therefore, it is desirable that the scoring rules to be stored in scoring rule storage unit 514 can be formed/updated by dedicated tools for developing scoring rules. If the rules are text-based, a user who understands the programming scheme mentioned above may describe the rules using a text editor.

Figure 7:
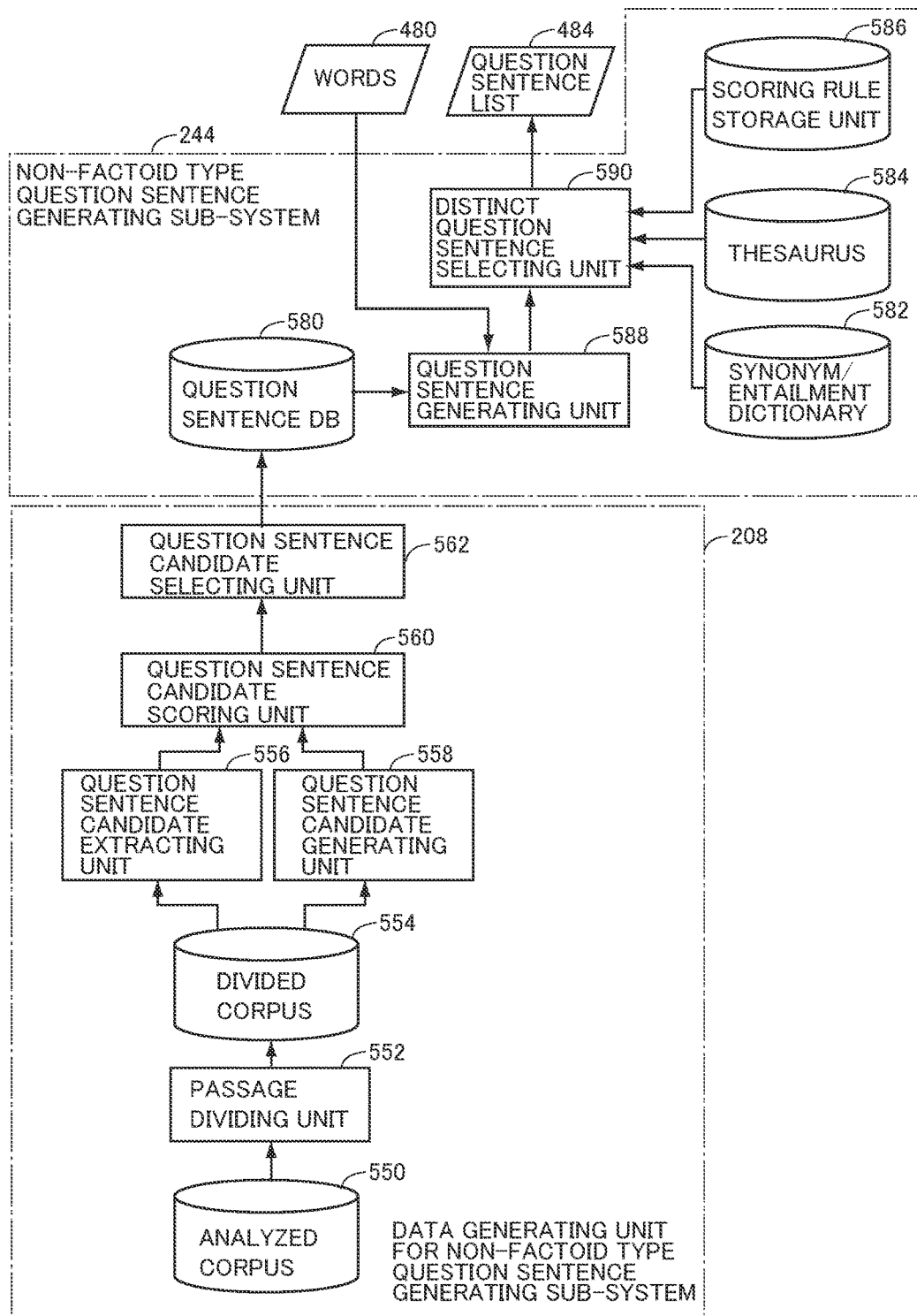
FIG. 7 is a block diagram showing a configuration of a non-factoid type question sentence generating sub-system of the question-answering system shown in FIG. 2.

FIG. 7 is a block diagram showing schematic configurations of data generating unit 208 for a non-factoid type question sentence generating sub-system, and a non-factoid type question sentence generating sub-system 244.

Referring to FIG. 7, data generating unit 208 for a non-factoid type question sentence generating sub-system includes: an analyzed corpus 550 configured to store outputs of dependency analyzing unit 282 shown in FIG. 3; a passage dividing unit 552 configured to divide each of the documents stored in analyzed corpus 550 into passages each containing about five sentences; and a divided corpus 554 configured to store the documents divided into the passages. The passages divided by passage dividing unit 552 may have portions overlapping with each other. Data generating unit 208 for a non-factoid type question sentence generating sub-system further includes: a question sentence candidate extracting unit 556 configured to extract, from each of the passages stored in divided corpus 554, a sentence having a form of a question as a question sentence candidate; a question sentence candidate generating unit 558 configured to generate, from each passage stored in divided corpus 554, a question sentence candidate having the passage or a part of the passage as an answer; a question sentence candidate scoring unit 560 configured to calculate, for each of the outputs from question sentence candidate extracting unit 556 and question sentence candidate generating unit 558, a score as a question sentence having the passage or a sentence included in the passage as an answer, using the same SVM as SVM 402 trained in non-factoid type question-answering sub-system 332 shown in FIG. 5; and a question sentence candidate selecting unit 562 configured to select only the question sentences having the scores calculated by question sentence candidate scoring unit 560 that are higher than a threshold value, and to build question sentence DB 580.

Non-factoid type question sentence generating sub-system 244 includes: a question sentence DB 580 having such a form that allows searching, using words as keys, for question sentences that include the words; a thesaurus 584; a synonym/entailment dictionary 582; a scoring rule storage unit 586 configured to store rules used when scoring question sentences, similar to scoring rule storage unit 514 shown in FIG. 6; a question sentence generating unit 588 configured to read, responsive to reception of words 480, question sentences from question sentence DB 580 using words 480 as keys and to generate a plurality of question sentence candidates; and a distinct question sentence selecting unit 590 configured to select distinct ones from the plurality of question sentences generated by question sentence generating unit 588, question sentence candidates by selecting distinct words and patterns representing synonyms or having similar meanings using thesaurus 584 and synonym/entailment dictionary 582, to calculate scores of question sentences following the rules stored in scoring rule storage unit 586, to classify the question sentences in accordance with the scores and to output the result as a question sentence list 484.

Figure 8:
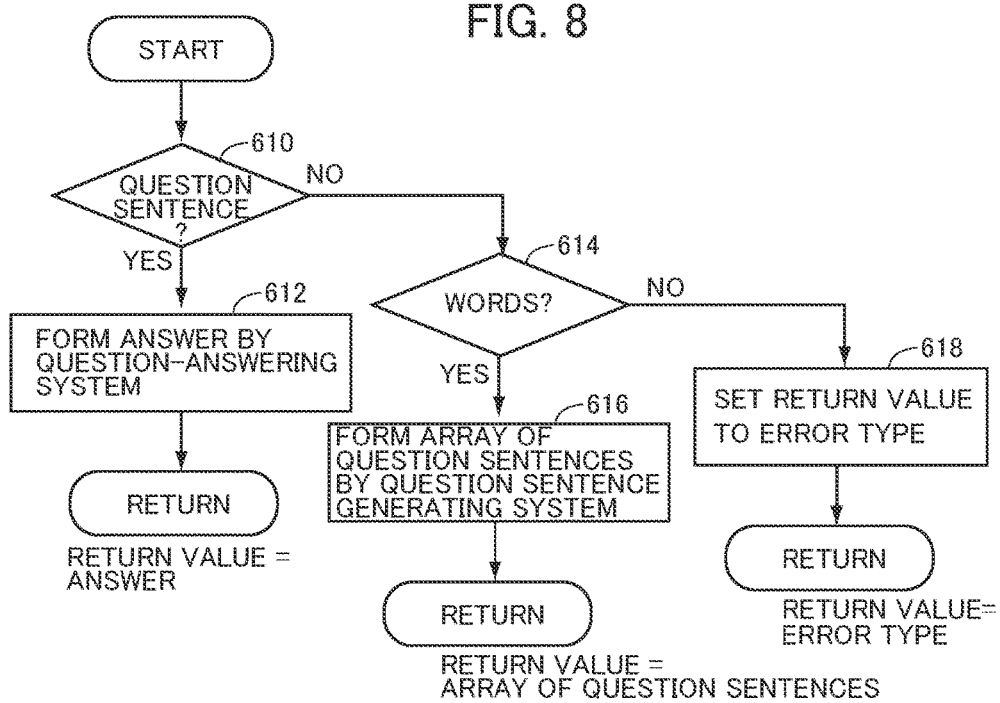
FIG. 8 is a flowchart representing a control structure of a program for allocating processes in accordance with inputs, in the question-answering system shown in FIG. 2.

FIG. 8 is a flowchart representing a program configured to assign processes, responsive to program executing system 238 shown in FIG. 2 receiving any request from a terminal device, to question-answering sub-system 240, factoid type question sentence generating sub-system 242 or non-factoid type question sentence generating sub-system 244 in accordance with a user input added to the request.

Referring to FIG. 8, the assignment program executed by program executing system 238 includes: a step 610 of determining whether or not the input is a question sentence and dividing control flow depending on whether the determination is positive or negative; a step 612, responsive to a positive determination at step 610, of causing question-answering sub-system 240 shown in FIG. 2 to generate an answer to the question and returning the control to the main routine with the answer as a return value; a step 614, responsive to a negative determination at step 610, of determining whether or not the input is words and dividing the control flow depending on whether the determination is positive or negative; a step 616, responsive to a positive determination at step 614, of passing the words to factoid type question sentence generating sub-system 242 and non-factoid type question sentence generating sub-system 244, causing these sub-systems to generate arrays of question sentences, collecting the results as one array and returning the control to the main routine with the array as a return value; and a step 618, responsive to a negative determination at step 614, of setting a return value variable to the value indicating the error type, and returning the control to the main routine.

[Operation]

Question-answering system 164 having the above-described structure operates in the following manner. The operation of question-answering system 164 is divided into two phases, that is, preparation and service, as will be described below.

<Preparation>

In the preparation phase, pattern dictionary 304 and answer sentence generating DB 306 shown in FIG. 4 are prepared, SVM 402 shown in FIG. 5 is trained, question sentence generating DB 502 shown in FIG. 6 is prepared, and question sentence DB 580 shown in FIG. 7 is prepared. Prior to these processes, question-answering system corpus 200 is prepared by collecting a large number of sentence examples from the websites on the Internet. Further, it is assumed that question type determining unit 334 (see FIG. 2), thesaurus 360 and synonym/entailment dictionary 362 (both see FIG. 4), thesaurus 508, synonym/entailment dictionary 510 and scoring rule storage unit 514 (see FIG. 6) and synonym/entailment dictionary 582, scoring rule storage unit 586 and thesaurus 584 (see FIG. 7) are also prepared beforehand.

(1) Preparation of Pattern Dictionary 304 and Answer Sentence Generating DB 306

Referring to FIG. 3, morphological analyzing unit 280 of pre-processing unit 202 performs morphological analysis of each of the sentences stored in question-answering system corpus 200, and applies a sequence of morphemes having grammatical information such as part of speech to dependency analyzing unit 282. Dependency analyzing unit 282 analyzes the dependency relation of original sentences based on the applied sequence of morphemes, and forms a network of dependency relations. Dependency analyzing unit 282 extracts, on the resulting network, every path having nodes larger in number than a prescribed lower limit and smaller than a prescribed upper limit. By concatenating words corresponding to these paths, one phrase or a sentence is obtained. Dependency analyzing unit 282 applies the phrases or sentences obtained in this manner to pattern collecting unit 308.

Pattern collecting unit 308 of question-answering sub-system data generating unit 204 classifies the phrases and sentences applied from dependency analyzing unit 282 to patterns, with reference to dictionary 300. In this classification, words belonging to each phrase or sentence are abstracted to classes to which the words belong, and words belonging to the same class are treated as the same word. In this manner, phrases and sentences of the same form are distinguished to result one pattern. Using the patterns and sentences obtained in this manner, pattern collecting unit 308 generates pattern dictionary 304 shown in FIG. 4. Pattern dictionary 304 consists of sentences and patterns each having unique pattern ID.

Pattern collecting unit 308 also forms answer sentence generating DB 306 in such a form that allows, for each phrase or sentence, searching for phrase or sentence keyed to words belonging thereto and pattern ID.

Similarly, DB building unit 302 of question-answering sub-system data generating unit 204 builds analyzed corpus 310 storing phrases and sentences output from dependency analyzing unit 282 and indexes for full-text search thereof.

(2) Training of SVM 402

Referring to FIG. 5, QA sentence extracting unit 420 extracts QA sentences from analyzed corpus 310 and stores them in QA sentence storage unit 422. Additional QA sentences may be manually stored to QA sentence extracting unit 420. QA sentence storage unit 422 also stores QA sentences of incorrect combinations, as QA sentences. These incorrect QA sentences may be manually input, or two sentences extracted at random from analyzed corpus 310 may be combined. A flag, indicating whether the QA sentence is correct or not, is attached to each QA sentence. Training data generating unit 424 generates training data for supervised learning of SVM 402 from each of the QA sentences stored in QA sentence storage unit 422, and stores the data in training data storage unit 426. Training unit 428 trains SVM 402 using the training data stored in training data storage unit 426. By such a training, SVM 402 is optimized to provide an output indicating whether a given QA sentence is a correct QA sentence as well as a score indicating reliability thereof.

(3) Preparation of Question Sentence Generating DB 502 for Factoid Type Question Sentence Generating Sub-System 242

Referring to FIG. 6, question sentence generating DB 502 is prepared in the similar manner as answer sentence generating DB 306 (see FIG. 3). It is noted, however, that question sentence generating DB 502 has such a database form that allows searching, when a certain word or words are given, for a pattern ID using the word or words as a key.

(4) Question Sentence DB 580 of Non-Factoid Type Question Sentence Generating Sub-System 244

Question sentence DB 580 shown in FIG. 7 is prepared in the following manner. First, in analyzed corpus 550 (similar to analyzed corpus 310 shown in FIG. 5 and pre-processed by pre-processing unit 202), each document is divided into passages each including about five sentences, and these passages are stored in divided corpus 554. Question sentence candidate extracting unit 556 generates all possible sequences of words generated from words existing in each passage, and converts these to the form of question sentences by a simple pattern conversion. Consider, for example, a passage containing two sentences, that is, "As you all know, the sky is blue." and "This is because molecules in the air scatter blue color component of sunlight." From the words in this passage, we can obtain a large number of word sequences such as "as you all know," "sky is blue," "this is because," "molecules in the air scatter" and "molecules in the air scatter blue color component of sunlight." By way of example, when these word sequences are converted to patterns in the form of "why is/do/does . . . ," we can obtain question sentence candidates such as "why do all of you know . . . " "why is the sky blue" "why is this because" "why do molecules in the air scatter" and "why do molecules in the air scatter blue color component of sunlight." If there is any sentence or expression corresponding to a question sentence in the passage, it is also extracted and added to question sentence candidates.

The question sentence candidates obtained in this manner are all given to question sentence candidate scoring unit 560. Question sentence candidate scoring unit 560 calculates and outputs a score indicating the degree of each question sentence candidate being a question having the original passage as an answer, using SVM 402 of non-factoid type question-answering sub-system 332 shown in FIG. 3. Question sentence candidate selecting unit 562 selects those of the question sentence candidates of which scores calculated by question sentence candidate scoring unit 560 are not lower than a threshold value, and stores them in question sentence DB 580. Question sentence DB 580 has such a form that allows searching, using a word or words as a key, for a question sentence including the word or words.

By generating question sentences in this manner, the following effects can be attained. Specifically, an individual sentence included in the original passage may not be an answer to a question on its own. In such a case, it is difficult to generate an appropriate question sentence from the individual sentence. According to the present embodiment, however, question sentences are generated from word sequences consisting of all possible combinations using words in the passage. Therefore, it becomes possible to obtain a question sentence of which answer is a combination of a plurality of sentences in the passage. Sometimes, a question sentence may be obtained, whose answer is the whole passage.

Further, by the method described above, combinations of every word in the passage are considered as question sentence candidates. Therefore, there is also an effect that question sentences can be generated in a very flexible way. The algorithm for this is simple. It is also possible, when the word combinations are generated, to put some restriction and thereby to use only combinations of words satisfying a certain condition. By way of example, restrictions may be posed such that only the combinations of words having dependency relations are to be used or only word sequences of continuous words are to be used. By doing so, computational cost for generating word sequences can be reduced.

The fact that appropriate question sentences can be selected by the method above can be understood from the following. If a passage is a correct answer (or includes a sentence as a correct answer) to a non-factoid type question, it must include an expression or sentence that is semantically the same as or similar to the question. If such an expression or a sentence is extracted beforehand from the passage, the expression or the sentence can be a representative source of a question that is the same as or similar to any question having the passage as an answer.

<At the Time of Service>
Initial Screen

Assume that a user activates a browser on a computer 168 shown in FIG. 1, enters an address of the top page of question-answering system 164 and presses a return key. As a result, an interface 230 of FIG. 2 receives the request and passes the request to web server 232. If the request does not specifically designate any program, web server 232 designates a specific program for generating a top page and gives the request to program executing system 238.

Program executing system 238 reads and executes the program designated by web server 232 from website responding program storage unit 236. Specifically, program executing system 238 executes instructions of the read program, combines necessary information from website responding DB 234 and static texts designated to be output in the program, thereby generates an HTML file representing the top page, and returns it to web server 232. Web server 232 returns the HTML file to the terminal that has sent the request, through interface 230. The HTML file has embedded therein forms for requesting detailed display of a specific article. In each form, information specifying the article and a program name for processing are designated. When the user clicks a button provided in the form requesting details of a specific article, the program name for displaying details of the article and information necessary for displaying details are transmitted to front end 210. When web server 232 applies this request to program executing system 238, program executing system 238 reads the designated program from website responding program storage unit 236, reads the article from website responding DB 234 in accordance with designated conditions, generates an HTML file for display and returns it to the counterpart terminal. In this manner, front end 210 dynamically generates screens in response to the request from the counterpart terminal and provides various pieces of information to the counterpart terminal.

When a Question Sentence is Input

When a question sentence is input, question-answering system 164 operates in the following manner.

Receiving a question sentence from a user, program executing system 238 gives the question sentence to question-answering sub-system 240, and returns a resulting answer sentence to the counterpart terminal. Receiving words in place of a question sentence from the counterpart terminal, program executing system 238 gives the words to factoid type question sentence generating sub-system 242 and to non-factoid type question sentence generating sub-system 244, to cause them to generate an array of question sentences. Program executing system 238 generates an HTML document with the thus obtained array of question sentences embedded and returns it to the counterpart terminal. In this example, a script or scripts are embedded in the HTML document such that the script or scripts transmit a question sentence to front end 210 in response to the click of each question sentence.

Figure 9:
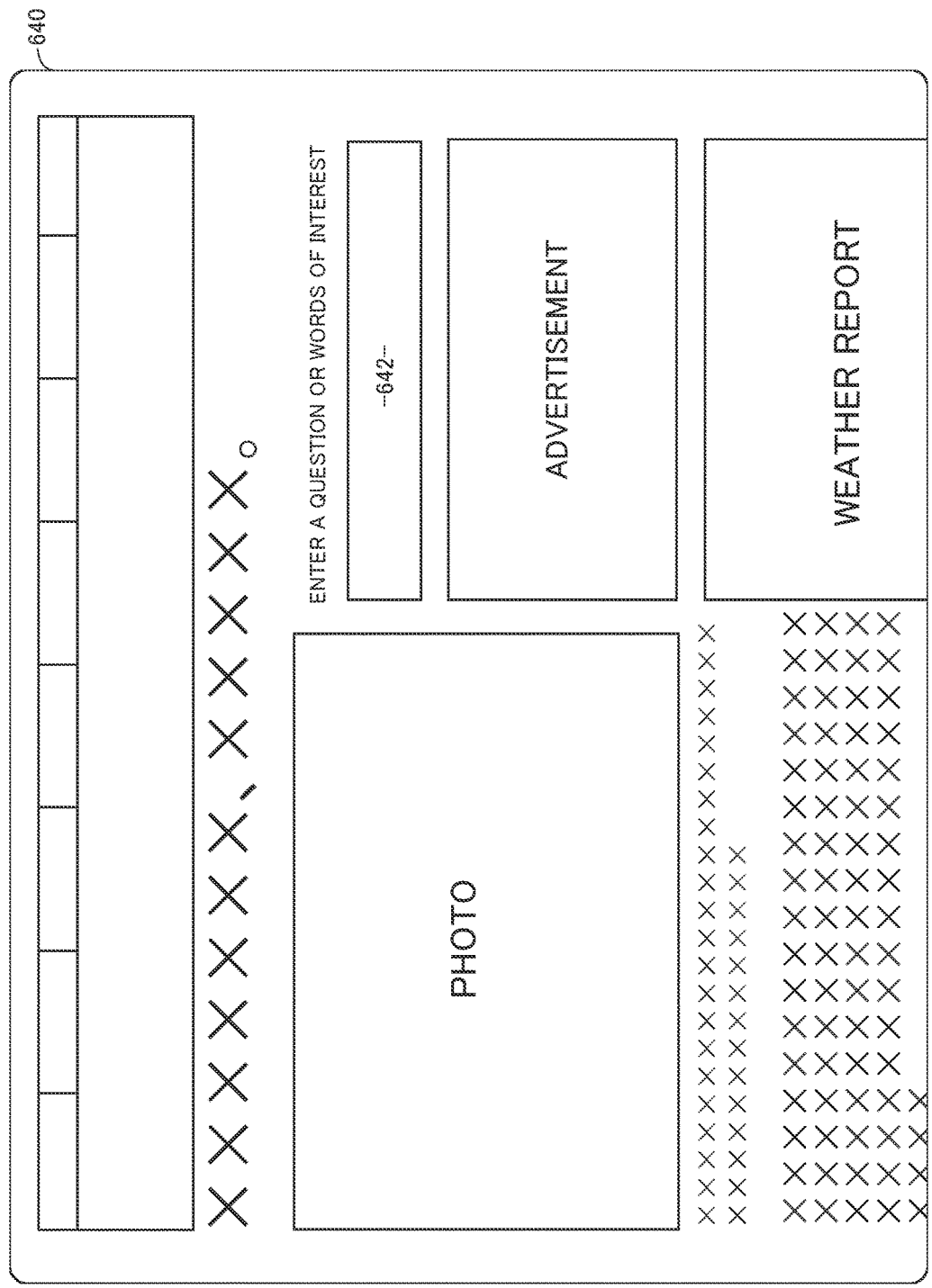
FIG. 9 shows an example of an initial screen of the question-answering system shown in FIG. 2.

In the present embodiment, when a top page of a website adopting question-answering system 164 is accessed, a screen such as shown in FIG. 9 is displayed. In this example, this website is assumed to be a news site. The top page 640 consists of various elements and, in this example, an input field 642 for entering a question sentence is provided near the center right of the screen. Immediately above the input field 642, a prompt is displayed for entering a question sentence or words of interest into input field 642. Below input field 642, advertisement, weather and various other pieces of information, not shown here, are displayed. The input field is a part of the form shown in FIG. 2 designating execution of a specific program. Here, let us assume that the user enters words "Abe administration" into input field 642.

These words are transmitted to front end 210 of question-answering system 164 together with the specific program name. Program executing system 238 of front end 210 reads the specific program from website responding program storage unit 236 and executes the same. The program includes, as a part of its routine, a program of which control structure is shown in FIG. 8. As a result, under the conditions described above, the words are applied to factoid type question sentence generating sub-system 242 and to non-factoid type question sentence generating sub-system 244 shown in FIG. 2 through the path of step 610 through step 614 to step 616 of FIG. 8.

Referring to FIG. 6, candidate searching unit 504 of factoid type question sentence generating sub-system 242 searches question sentence generating DB 502 using the input words 480 as a key for a pattern ID of an answer sentence that co-occurs with the words. Question sentence generating unit 506 searches pattern dictionary 500 using the pattern ID and the words given from candidate searching unit 504, and thereby retrieves access information to a sentence that has the words and the pattern specified by the pattern ID. Further, question sentence generating unit 506 accesses question-answering system corpus 200 using the access information, and it can retrieve the target sentence. As a result, a sentence that has a pattern corresponding to the pattern ID output by candidate searching unit 504 and including the words 480 can be retrieved from question-answering system corpus 200. Since a large number of sentences are stored in question-answering system corpus 200, generally, a considerable number of sentences would be retrieved. Question sentence generating unit 506 transforms sentences retrieved in this manner to the form of question sentences. By way of example, assume that the words "Abe administration" are given as words 480, and the pattern ID retrieved from question sentence generating DB 502 is "A aims at B." Further assume that there is a sentence "Abe administration aims at participation in TPP" in question-answering system corpus 200. This sentence includes the words "Abe administration" and, therefore, it is retrieve from question-answering system corpus 200 by question sentence generating unit 506. Question sentence generating unit 506 holds rules for transforming sentences of each pattern to the question form. For instance, for a sentence "A aims at B," it holds transformation rules such as (1) "What does A aim at?" and (2) "Who aims at B?" Here, we use that transformation rule which leaves, from among the words in the pattern, those words corresponding to words 480. In the example here, the rule of example (1) is adopted and, thus, a question sentence "What does Abe administration aim at?" is generated.

Question sentence generating unit 506 generates question candidates for each of the sentences retrieved from question-answering system corpus 200 in accordance with the patterns and words by the process as described above, and applies the resulting candidates to distinct question sentence selecting unit 512.

Question-answering system corpus 200 includes a large number of sentences collected from websites on the Internet. Therefore, typically, there is a plurality of the same sentences or the sentences having substantially the same meaning with slightly different form or different expressions. Displaying all these sentences could be annoying to the user. Displaying divergent question sentences would be more helpful for the user to form a question. Therefore, distinct question sentence selecting unit 512 changes all synonymous words to an identical one or replaces a plurality of words representing different concepts of lower level by a word representing a common concept of higher level with reference to thesaurus 508 and synonym/entailment dictionary 510. Distinct question sentence selecting unit 512 normalizes those of resulting sentences that come to be the same into one sentence, or normalizes those patterns having different sentence patterns but having the same contents to an identical pattern. As a result, distinct question sentence candidates are selected. Further, distinct question sentence selecting unit 512 scores the question sentence candidates following the scoring rules stored in scoring rule storage unit 514. The question sentences are classified in accordance with the scores, and a prescribed number of question sentence candidates having higher scores are selected and output as a question sentence list 482.

Referring to FIG. 7, when words 480 are applied, non-factoid type question sentence generating sub-system 244 operates as follows. When words 480 are given, question sentence generating unit 588 searches question sentence DB 580 using the words as keys, and retrieves non-factoid type question sentence candidates. Question sentence DB 580 also stores a large number of question sentences. Therefore, typically, a large number of question sentence candidates are retrieved by question sentence generating unit 588. Distinct question sentence selecting unit 590 normalizes these large number of question sentence candidates using thesaurus 584 and synonym/entailment dictionary 582. Further, distinct question sentence selecting unit 590 scores the remaining question sentence candidates following the scoring rule stored in scoring rule storage unit 586, classifies them, and selects a prescribed number of question sentences having higher scores and outputs them in the form of a question sentence list 484.

Again referring to FIG. 2, program executing system 238 generates an HTML source file having embedded texts of question sentences output from factoid type question sentence generating sub-system 242 and non-factoid type question sentence generating sub-system 244, and a script responsive to a click on one of the question sentences, configured to transmit the clicked question sentence to question-answering system 164. Program executing system 238 transmits it to the counterpart terminal through web server 232 and interface 230.

Figure 10:
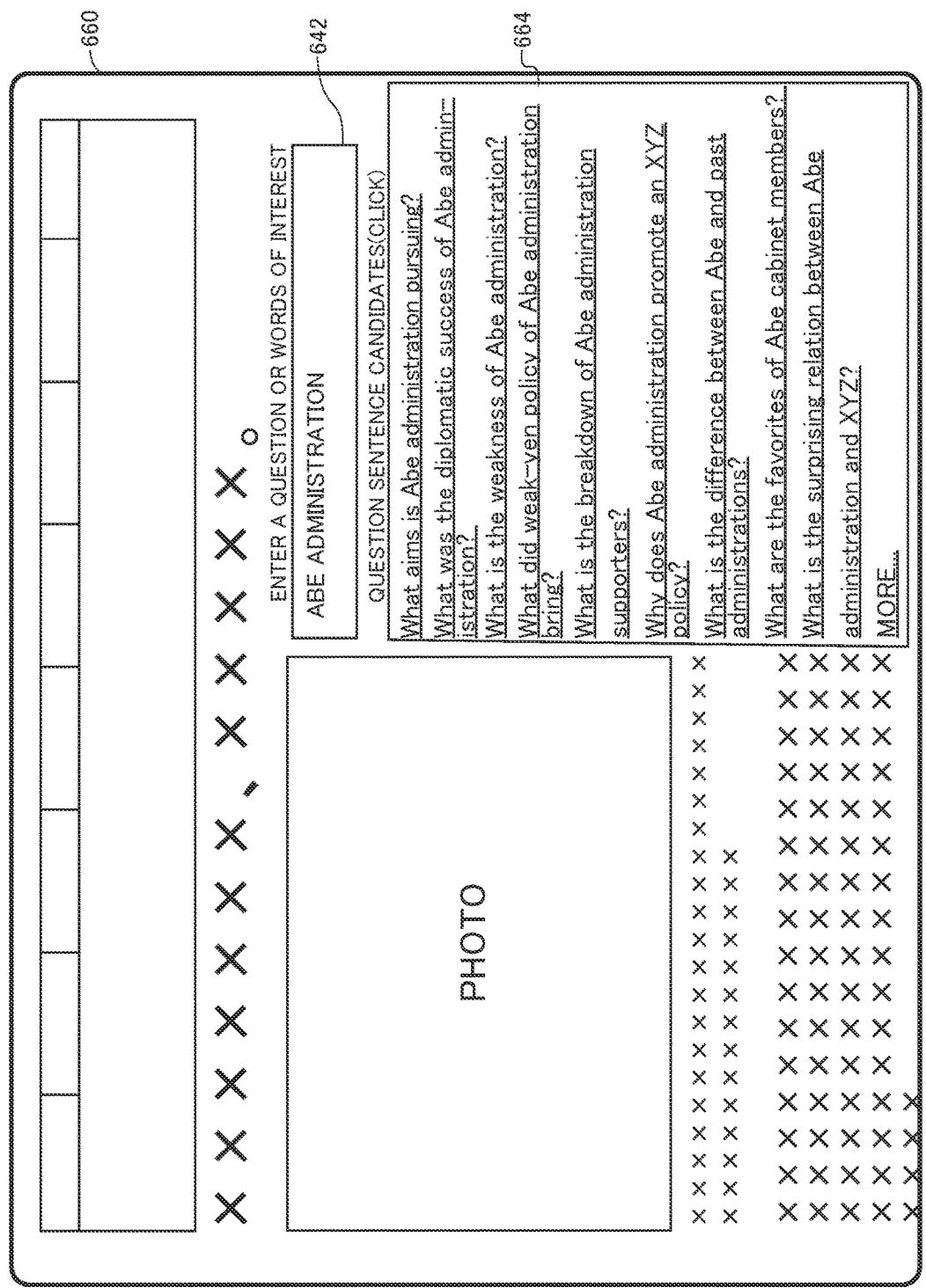
FIG. 10 shows an example of a screen of the question-answering system displayed when words and the like are entered on the screen shown in FIG. 9.

A page 660 shown in FIG. 10 is displayed on the counterpart terminal. Different from top page 640, in page 660, immediately below the input field 642, a plurality of question sentences 664 formed based on the words "Abe administration" are displayed. In this example, when any of question sentences 664 is selected, the question sentence is processed as an input to input field 642 by the script embedded in the HTML file, and a request including the question sentence is transmitted to question-answering system 164.

In this case, question-answering system 164 operates in the following manner. Referring to FIG. 2, the request is applied to program executing system 238 through interface 230 and web server 232. Program executing system 238 reads and executes the program having the control structure shown in FIG. 8.

Referring to FIG. 8, here, the determination at step 610 is positive, and an answer to the question sentence is generated by question-answering sub-system 240 at step 612, and transmitted to the counterpart terminal.

More specifically, referring to FIG. 2, the question sentence is passed from program executing system 238 to question-answering sub-system 240. Referring to FIG. 3, question type determining unit 334, upon reception of the question sentence 260, determines whether the question is of the factoid type or non-factoid type, and applies the result of determination to question classifying unit 336 and answer selecting unit 338.

Question classifying unit 336 applies the question sentence 340 to factoid type question-answering sub-system 330 if it is a factoid type question, and applies the question sentence 342 to non-factoid type question-answering sub-system 332 if it is a non-factoid type question.

If the question is of the factoid type, factoid type question-answering sub-system 330 operates in the following manner. Referring to FIG. 4, question analyzing unit 364 analyzes question sentence 340 using thesaurus 360 and synonym/entailment dictionary 362, specifies a pattern ID of the pattern in the answer sentence corresponding to question sentence 340 and words appearing in the question sentence, and applies these to query generating unit 366.

Query generating unit 366 generates a query sentence for searching answer sentence generating DB 306 for answer candidates using the given pattern ID and the appearing words as keys, and applies it to answer sentence searching unit 368. Answer sentence searching unit 368 inputs the query sentence to answer sentence generating DB 306, and thereby reads answer candidates from answer sentence generating DB 306 and applies them to answer selecting unit 370. Answer selecting unit 370 selects that one of the read answer candidates which are the most appropriate as an answer to question sentence 340, and applies it to program executing system 238 as answer sentence 344. Selection by answer selecting unit 370 here may be realized by scoring the answer candidates, using the number of words shared by the question sentence 340 and the answer candidates, combinations of patterns of these two, or combinations of word classes and levels used by these two, and so on.

As a result, an answer sentence corresponding to the question sentence is returned from question-answering system 164 and displayed on the screen.

By contrast, if the question is of non-factoid type, non-factoid type question-answering sub-system 332 operates in the following manner. Referring to FIG. 5, upon reception of a question sentence 342, question sentence analyzing unit 450 performs predetermined grammatical analysis of the question sentence and, for each content word included in question sentence 342, forms and outputs information necessary for generating features. Candidate sentence retrieving unit 452 performs full-text search of analyzed corpus 310 based on the output information, retrieves only a prescribed number of answer candidates each including each word in question sentence 342, and stores them in answer candidate sentence storage unit 454 together with their grammatical information.

For each combination of each answer candidate stored in answer candidate sentence storage unit 454 and question sentence analyzing unit 450, feature vector generating unit 456 generates a feature vector having the same configuration as the feature vector generated by training data generating unit 424 using their grammatical information. It is noted, however, that unlike those generated by training data generating unit 424, the feature vector does not have any flag that indicates whether the combination is correct or not.

Answer sentence ranking unit 458 applies the feature vector obtained for each combination of the question sentence and each answer candidate to SVM 402, and receives a score from SVM 402. The score indicates how fitting each answer candidate is as an answer sentence to the question sentence. Answer sentence ranking unit 458 ranks the combinations each including the question sentence and the respective one of the answer candidates obtained in this manner in accordance with their scores in a descending order, and outputs the answer sentence at the top as answer sentence 346.

When a user inputs a question sentence from the start, question-answering sub-system 240 processes the question sentence in the similar manner as described above, and returns an answer to the counterpart terminal.

[Computer Implementation]

Figure 11:
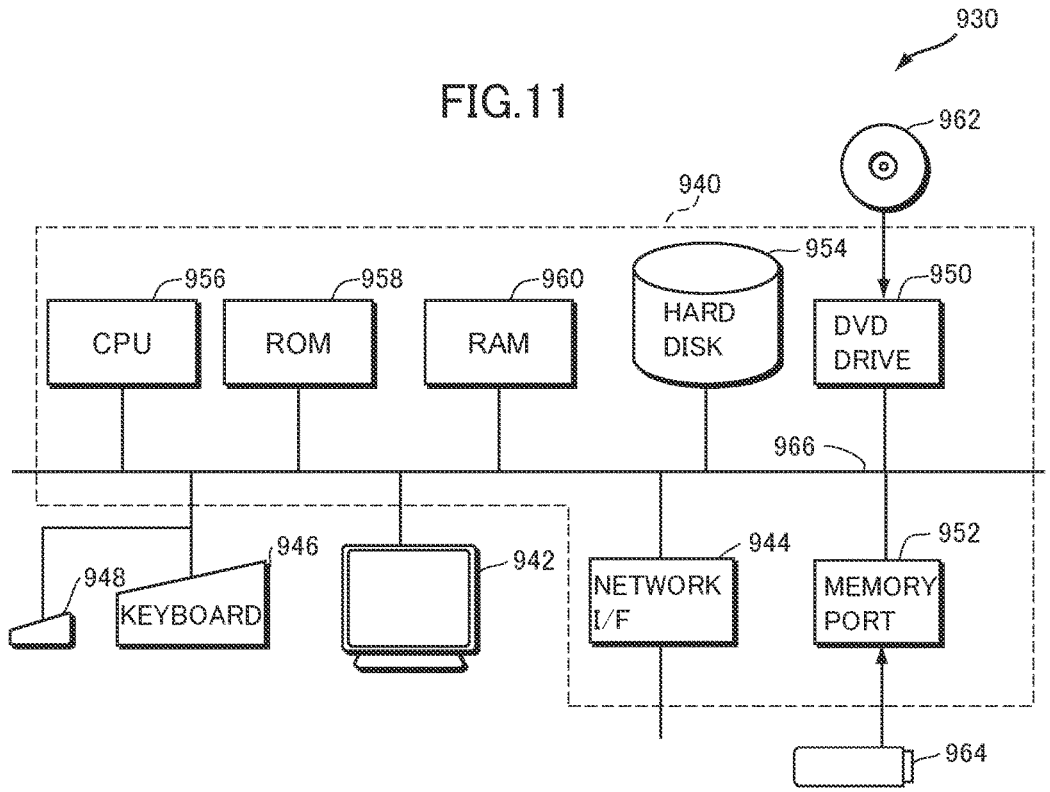
FIG. 11 is a block diagram showing a hardware configuration of a computer implementing the question-answering system adopting the question sentence generating device in accordance with an embodiment of the present invention.

Question-answering system 164 in accordance with the above-described embodiment can be implemented by computer hardware and software running thereon. Referring to FIG. 11, a computer system 930 includes a computer 940 having a memory port 952 and a DVD (Digital Versatile Disc) drive 950, and further includes a keyboard 946, a mouse 948, and a monitor 942. Since the database used is huge and question-answering system corpus 200 requires a storage device of large memory capacity, and since better response is desired, actually, distributed processing by a plurality of computers is adopted. For convenience, here, description will be given assuming that question-answering system 164 is implemented by one computer.

In addition to memory port 952 and DVD drive 950, computer 940 includes: a CPU (Central Processing Unit) 956; a bus 966 connected to CPU 956, memory port 952 and DVD drive 950; a read only memory (ROM) 958 storing a boot-up program and the like; and a random access memory (RAM) 960, connected to bus 966, for storing program instructions, a system program, work data and the like. Computer system 930 further includes a network interface (I/F) 944 providing network connection to enable communication with other terminals.

The computer program causing computer system 930 to function as various functional units of question-answering system 164 is stored in a DVD 962 or a removable memory 964, which is loaded to DVD drive 950 or memory port 952, and transferred to a hard disk 954. Alternatively, the program may be transmitted to computer 940 through a network, not shown, and stored in hard disk 954. At the time of execution, the program is loaded to RAM 960. The program may be directly loaded to RAM 960 from DVD 962, from removable memory 964, or through network I/F 944.

The program includes a plurality of instructions causing computer 940 to function as various functional units of question-answering system 164. Some of the basic functions necessary to carry out such operations may be provided by the operating system (OS) running on computer 940, by third-party programs, or various programming tool kit modules installed in computer 940. Therefore, the program itself does not necessarily include all functions to realize the system and method of the present embodiment. The program may include only the instructions that call appropriate functions or appropriate program tools in the programming tool kits in a controlled manner to attain a desired result, thereby executing the operation as the non-factoid type question-answering system described above. The operation of computer system 930 is well-known and, therefore, it will not be repeated here.

In question-answering system 164 in accordance with the above-described embodiment, when a user inputs words of his/her interest, a list of questions related to the words and having high possibilities of bringing about correct answers from the question-answering system is presented. By clicking the question sentence that likely leads to an answer he/she wants among the presented questions, the user can get the answer to the question with a high possibility. Specifically, he/she can easily obtain the information he/she desires without the necessity of repetitively form and try question sentences. Further, resources necessary for presenting question sentences can automatically be prepared by the computer. Therefore, the invention attains the effect that the above-described system can easily be built in a wide variety of applicable fields.

It is possible to measure the accuracy of original question-answering system (question-answering sub-system 240 shown in FIG. 2 of the embodiment above) in advance through experiments. By way of example, for a non-factoid type question, it is possible to estimate, from the results of experiments, the degree of accuracy for each threshold value of scores used for selection by answer sentence ranking unit 458 shown in FIG. 5. For a factoid type question, it is possible to measure in advance the degree of accuracy of answers obtained for each pattern of questions. Based on the accuracy, the threshold value of scores to be used when a question sentence to be presented to the user is generated and/or patterns used for generating the question sentence may be restricted, and whereby a question sentence guaranteed to have answers of certain accuracy or higher can be generated by the question-answering system.

[Modification]

The embodiment above is directed to Japanese language. Application of the present invention, however, is not limited to Japanese. By using different dictionaries in accordance with different languages, for example, it becomes possible to realize the question-answering system and the question sentence candidate generating sub-system for various languages with similar configurations. It is also possible to set up systems for different languages beforehand, and the list of question sentences and answers may be output by an appropriate language system by automatically recognizing the language of an input.

In the embodiment above, factoid type question sentence generating sub-system 242 and non-factoid type question sentence generating sub-system 244 shown in FIG. 2 both generate and output lists of question sentences. The present invention, however, is not limited to such an embodiment. By way of example, an answer sentence may be added to each question sentence candidate in an HTML file, and the HTML file may be output to a browser. In that case, the answer to each question sentence may be displayed from the start, or it may not be displayed. If it is not displayed at the start, a script causing the display upon a click of the question sentence by the user may be embedded in the HTML sentences.

In the embodiment above, a question sentence candidate is generated as a complete natural language sentence. The question sentence candidate, however, may not be necessarily a complete natural language sentence, and it may be generated in the form of an affirmative sentence in which an important word as an answer to the question of a natural language sentence is represented by some symbol (such as "X").

Further, in the embodiment above, when words and the like are input, question sentence candidates related to the words are generated. It is not limiting, however, and inputs in the form of modified noun phrase (ending a sentence with a noun) may be processed.

In the embodiment above, both factoid type and non-factoid type question sentences are generated; however, only one type of question sentences may be generated.

In the embodiment above, part of or all of the patterns are associated with thesaurus indicating semantic classifications. Here, using the classifications, it is possible to limit the generated question sentences to patterns related to a selected part of the semantic classes. By way of example, a pattern of "B is launched" may be associated with a class "CREATION" and if a sentence including a pattern associated with the class CREATION is obtained, a sentence asking the reason may be generated by adding "why" at the start, whereby making highly semantic processing possible. Similar processing is possible for nouns and the like. For example, assume that "Abe administration" is associated with a class "political body." In that case, if a sentence including a noun associated with a political class is obtained, it is possible to generate, for example, a question asking its aim. If words such as "global warming" are associated with a class "social problem," it becomes possible to generate a question sentence asking consequences by combining semantic classifications of patterns for a sentence including the words "global warming." It is noted that the present invention is not limited to such embodiments, and it may provide a system of simply collecting and classifying patterns.

As to the classification to semantic classes and thesaurus involving orientation and tendencies of questions to be generated, these may be automatically learned from a large amount of documents beforehand.

In the embodiment above, candidates of question sentences are generated and presented when words and the like are given by a user. The present invention, however, is not limited to such an embodiment. For example, when an answer sentence to a question is obtained, further candidates of question sentences may be generated using a word or words included in the answer and presented to the user. With such an approach, deeper analysis of a question becomes possible even after it is answered to. Namely, by combining a plurality of automatically generated question sentences, more complicated questions can be generated.

In the embodiment above, a word or an answer sentence is presented as an answer to a question sentence. The present invention, however, is not limited to such an embodiment. By way of example, a part of a newspaper article related to the answer obtained in this manner may be simultaneously presented.

In the embodiment above, users are not distinguished. By asking user registration, however, it becomes possible to accumulate tendency of question sentences selected by each user and to effectively use the resulting information. As a result, it becomes possible to more efficiently utilize the question-answering system by means of the question sentence generating system described above. For example, question sentences including words belonging to a class or classes the user prefers may be presented high on the list, question sentences having patterns frequently used by the user may be presented high on the list, or a field to which question sentences to be extracted belong can be limited to a certain extent based on the history of question selection by the user.

In the embodiment above, question candidates are presented to the user in a simple form of a list. The manner of presentation, however, is not limited thereto. For instance, question candidates may be classified in accordance with their topics, and they may be presented topic by topic. Visually, questions belonging to different topics may be classified and displayed on different areas on a screen. If possible, different areas should be displayed in different colors. By such an approach, it becomes possible to visually understand the relation between each of the generated questions, making it easier for the user to select a question.

In the embodiment above, when non-factoid type question sentence candidates are scored, SVM 402 is used. What is used for scoring, however, is not limited to an SVM. Any method used in the so-called machine learning that outputs any score to an input using a model may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to services presenting an answer to a question given in a natural language and to a question-answering system used for such services.

REFERENCE SIGNS LIST

164 question-answering system
232 web server
238 program executing system
200 question-answering system corpus
204 question-answering sub-system data generating unit
206 data generating unit for a factoid type question sentence generating sub-system
208 data generating unit for a non-factoid type question sentence generating sub-system
240 question-answering sub-system
242 factoid type question sentence generating sub-system
244 non-factoid type question sentence generating sub-system
304 pattern dictionary
306 answer sentence generating DB
310, 550 analyzed corpus
330 factoid type question-answering sub-system
332 non-factoid type question-answering sub-system
340, 342 question sentence
344, 346 answer sentence
360, 508, 584 thesaurus
362, 510 synonym/entailment dictionary
364 question analyzing unit
400 SVM training unit
402 SVM
404 answer sentence generating unit
480 words
482, 484 question sentence list
502 question sentence generating DB
506, 588 question sentence generating unit
512, 590 distinct question sentence selecting unit

The invention claimed is:

1. A question sentence generating device for use with a question-answering system, the question sentence generating device comprising:
    an interface configured to receive a word or a word sequence as a source for generating a question sentence; and
    a memory including a database comprised of a plurality of records for generating question sentences, wherein:
        each of said plurality of records has a key word and is generated from an answer having an answer sentence pattern co-occurring with the key word;
    a processor configured to:
        using the received word as a key, search and retrieve from said question sentence generating database an answer sentence pattern;
        generate a question sentence from the retrieved answer sentence pattern and said received word, comprising:
            generating question candidates by (1) transforming the retrieved answer sentence pattern into a plurality of question patterns and (2) combining each of the plurality of question patterns with the received word;
            scoring each of the question candidates, wherein the score indicates a fit of each question sentence candidate as being a question having as an answer the answer from which the answer sentence pattern is generated; and
            selecting as the question sentence the question sentence candidate having a best score; and
        output the generated question sentence.

2. The question sentence generating device according to claim 1, wherein:
    the memory additional includes a synonym dictionary configured to store synonymous relation or entailment relation of a word or an answer sentence pattern or both; and
    the processor is further configured to:
        generate a plurality of question sentences;
        select distinct ones of said generated plurality of question sentences to generate a smaller number of question sentences by referring to said synonym dictionary; and
        output the generated smaller number of question sentence.

3. The question sentence generating device according to claim 1, wherein:
    the memory additional includes a thesaurus configured to store classification information for classifying words or answer sentence patterns or both systematically in accordance with their meanings; and
    the processor is further configured to:
        generate a plurality of question sentences;
        select distinct ones of said generated plurality of question sentences to a smaller number of question sentences by referring to said thesaurus; and
        output the generated smaller number of question sentences.

4. The question sentence generating device according to claim 1, wherein
    said processor is configured to:
        receive a plurality of words; and
        search said question sentence generating database, using the received plurality of words, for an answer sentence pattern co-occurring with the received plurality of words.

5. The question sentence generating device according to claim 1, wherein
    said processor is further configured to:
        search and retrieve said question sentence generating database for an answer sentence pattern using the received word as a key;
        generate a question sentence and an answer sentence to the question sentence from the retrieved answer sentence pattern and said received word; and
        output the generated question sentence and the generated answer sentence to the question sentence.

6. The question sentence generating device according to claim 1, wherein
    said question-answering system includes a factoid type question-answering sub-system responsive to a factoid type question sentence;

said factoid type question-answering sub-system is configured to generate an answer sentence candidate by searching an answer sentence generating database using a key consisting of a pattern of the question sentence and a word or a word sequence included in the question sentence; and said answer sentence generating database and said question sentence generating database include common records generated from the same corpus.

7. The question sentence generating device according to claim 1, wherein:

said question-answering system further includes a non-factoid type question-answering sub-system responsive to a non-factoid type question;

said non-factoid type question-answering sub-system is configured:

to extract a plurality of passages as answer sentence candidates from a corpus, to calculate a score indicating fitness as an answer to said given question by using a pre-learned scoring means, and to output an answer sentence candidate having the highest score as an answer to said given question;

the memory further includes a question sentence database configured to store a plurality of question sentences each generated from any of a set of passages prepared in advance and not explicitly distinguished as a question or an answer and having as an answer a passage as a source of said question sentence;

the processor is further configured to:

receive a second word or a second word sequence as a source of generating a question sentence;

generate and output a new question sentence from the received second word or second word sequence as the source of generating the question sentence or synonyms or entailments of these and from a question sentence stored in said question sentence database by referring to said question sentence database; and collectively output the generated question sentence and the generated new question sentence.

8. The question sentence generating device according to claim 1, wherein the scoring of each of the question candidates is performed using a machine learning algorithm.

9. A question sentence generating device for use with a question-answering system, wherein:

said question-answering system includes:

a non-factoid type question-answering sub-system responsive to a non-factoid type question, wherein the non-factoid type question-answering sub-system is configured to:

extract a plurality of passages as answer sentence candidates from a corpus, calculate a score for each passage, said score indicating fitness as an answer to said given question; and output an answer sentence candidate having the highest score as an answer to said given question;

said question sentence generating device comprising:

a memory including a question sentence database configured to store a plurality of question sentences each generated from any passage in said corpus and having as an answer a passage as a source of generating the question sentence;

an interface configured to receive a word or a word sequence; and a processor configured to generate and output a new question sentence from the received word or word sequence as the source of generating the question sentence or synonyms or entailments of these and from a question sentence stored in said question sentence database by referring to said question sentence database.

10. A computer program stored on a non-transitory computer readable medium causing a computer to function as a question sentence generating device for use with a question-answering system, wherein said computer is connected to a question sentence generating database comprising a plurality of records for generating question sentences, each of said plurality of records having a key word and is generated from an answer having an answer sentence pattern co-occurring with the word, wherein, when executed by a processor, said computer program causes said processor to:

receive a word or a word sequence as a source for generating a question sentence; and search and retrieve from said question sentence generating database an answer sentence pattern using a key consisting of the received word;

generate a question sentence from the retrieved answer sentence pattern and said received word, comprising:

generating question candidates by (1) transforming the retrieved answer sentence pattern into a plurality of question patterns and (2) combining each of the plurality of question patterns with the received word;

scoring each of the question candidates, wherein the score indicates a fit of each question sentence candidate as being a question having as an answer the answer from which the answer sentence pattern is generated; and selecting as the question sentence the question sentence candidate having a best score; and; and output the generated question sentence.

11. The computer program according to claim 10, wherein the scoring of each of the question candidates is performed using a machine learning algorithm.

* * * * *